United States Patent [19]

Inoue

[11] 4,005,303
[45] * Jan. 25, 1977

[54] EDM PARAMETER CONTROL SYSTEM

[75] Inventor: Kiyoshi Inoue, Tokyo, Japan

[73] Assignee: Inoue-Japan Research Inc., Yokohama, Japan

[ * ] Notice: The portion of the term of this patent subsequent to Apr. 1, 1992, has been disclaimed.

[22] Filed: Jan. 14, 1975

[21] Appl. No.: 540,970

Related U.S. Application Data

[62] Division of Ser. No. 338,849, March 7, 1973, Pat. No. 3,875,374.

[30] Foreign Application Priority Data

Mar. 7, 1972  Japan .............................. 47-23334

[52] U.S. Cl. ...................... 219/69 C; 219/69 M; 219/69 P; 235/151.11
[51] Int. Cl.² ........................................ B23P 1/08
[58] Field of Search ............ 219/69 C, 69 M, 69 G, 219/69 P; 235/151.11

[56] References Cited

UNITED STATES PATENTS

| 3,739,136 | 6/1973 | Marendaz | 219/69 C |
| 3,764,775 | 10/1973 | Hassingler | 235/151.11 |
| 3,781,507 | 12/1973 | Inoue | 219/69 G |
| 3,793,502 | 2/1974 | Bell | 219/69 C |
| 3,816,692 | 7/1974 | Ratmansky | 219/69 C |

Primary Examiner—Bruce A. Reynolds
Attorney, Agent, or Firm—Karl F. Ross; Herbert Dubno

[57] ABSTRACT

An EDM apparatus in which the control system is fully adaptive by having a reference counter which is stepped up or down depending upon the occurrence of undesirable discharge conditions. The control system thus includes a counter receiving signals representing a desirable gap condition over a relatively short time period and signals representing the non-development of the undesirable condition over a relatively long time period as established by appropriate timer means. A parameter of the gap is controlled in response to a comparison of the gap condition over a sequence of pulses with a desirable state as represented by the count registered in the counter.

20 Claims, 4 Drawing Figures

EDM PARAMETER CONTROL SYSTEM

CROSS REFERENCE TO RELATED APPLICATION

This application is a division of Ser. No. 338,849 filed Mar. 7, 1973, now U.S. Pat. No. 3,875,374.

FIELD OF THE INVENTION

The present invention relates to a control system for electrical-discharge machining (EDM) and, more particularly, to a system for controlling one or more machining parameters in the course of an EDM operation.

BACKGROUND OF THE INVENTION

In the EDM process, electric pulses are passed intermittently across the machining gap formed in a dielectric liquid between a tool electrode and a workpiece, each pulse bringing about an electric discharge through the dielectric-filled gap to remove material from the workpiece. As the material removal or machining proceeds, the tool electrode is advanced relative to the workpiece by a servo feed arragement to maintain the machining gap at a given size. The servo arrangement may also function to respond to gap short-circuit and arcing conditions to retract the electrode relative to the workpiece thereby removing such conditions.

During the maching operation, small chips and particles, tar and other materials produced by electric discharges are carried away by the dielectric liquid. The latter is generally circulated through the gap and forced to flow from or to be sucked into a bore formed through the electrode and/or the workpiece and directly open to the machining region. In certain EDM applications, however, in which machining is to be performed under "no wear" conditions, requiring minimization of the wear of the tool electrode by the machining discharges, it has been found to be undesirable to forcibly circulate the dielectric liquid through the machining region, at least during the time in which a train of machining discharges are produced through the gap. Accordingly, in such applications, it has been the practice to interrupt the supply of machining pulses to the gap periodically and to effect the forced dielectric supply through the tubular electrode or workpiece selectively during the pulse interruption periods. Another technique which has been used heretofore is to intermittently retract or reciprocate the electrode relative to the workpiece independently of the gap adjusting function by the servomechanism. This latter technique, in which the retraction of the electrode relative to the workpiece is followed in each reciprocating cycle by returning them to their normal, machining relative positions, has been found to be an especially simple and advantageous method effective to cleanse the gap contaminants while permitting the machining action to proceed under the required no-wear conditions. In this case, one or more nozzles can be employed and positioned externally of the machining gap to direct a stream or streams of the fresh dielectric liquid toward the machining region.

As machining proceeds and the tool electrode penetrates progressively into the workpiece, increasing the depth of a cavity being formed therein, the discharge condition in the gap tends to become generally unstable, as a result of increasing difficulty in removing chips and other contaminants from the region of the gap cavity, thereby causing undesirable short-circuiting and substained arcing to develop between the tool electrode and the workpiece and damaging either or both of them. In order to counter these difficulties, various corrective and programmed or anticipatory measures have been proposed and are being used in existing EDM machine tools. These measures include changing the rate of dielectric flow through the gap and the use of a reciprocatory movement as mentioned in the preceeding paragraph in a controlled manner. Also, control of machining pulses has been found to be important. For such control, reference is here made to KIYOSHI INOUE U.S. Pats. No. 3,539,755 issued Nov. 10, 1970 and No. 3,536,881 issued Oct. 27, 1970. These patents disclose concepts for adaptive control of the gap current by controlling machining pulse on time and/or off time in response to a signal derived from the gap to optimize the EDM process by protecting the gap against sustained arcing and other undesirable conditions or by maintaining the gap current density constant with the process of machining. It has also been found desirable to alter, in the course of a machining operation, a threshold value settable in a servocontrol circuit and in a machining pulse generator circuit in order that the problem as noted above be removed or alleviated effectively. For this type of control concept, reference is here made to KIYOSHI INOUE U.S. Pat. Nos. 3,604,885 and 3,686,461 issued Sept. 14, 1971 and Aug. 22, 1972, respectively. Proposals have also abeen made in the art heretofore to conrollingly change voltage and current magnitudes of a series of machining pulses or the waveform configuration thereof with the progress of machining or in response to the gap condition.

While, by virtue of these control concepts, significant advances have been made in the art of EDM to improve the quality of machining and it has become possible to automatize an EDM operation, existing systems embodying these control concepts are found not to be satisfactory in terms of machining efficiency which can be expressed as the time required to complete a given machining operation and to have a desired result. Furthermore, many EDM control systems now brought into practice are, in spite of their efforts, not successful to completely prevent or suppress thermal arcing which damages the workpiece or the tool electrode or both as noted previously. If successful, these efforts may result in an undue decrease in machining efficiency. In many commercial EDM machine tools, the occurrence of the arcing damage could only be prevented by the skilled operator's supervision of the machine or otherwise by the stopping of the machining operation. In summary, therefore, there are vital needs for a control system which provides an increased machining efficiency, insures excellent machining results which are free from arcing damages and permits the operation to proceed on a full or practically completely automatic basis.

SUMMARY OF THE INVENTION

It is the object of the present invention to provide a novel control system for controlling one or more of the critical EDM parameters as set forth previously, which system can fulfill these needs.

According to the principles of the present invention, the improved control system comprises monitor means coupled with an EDM gap for monitoring the stage of EDM performance therein and providing a first signal upon detection of an undesirable condition in the EDM gap through the monitoring thereof over a relatively short time period. The monitor means is also adapted to provide a second signal upon nondetection of such an undesirable condition in the EDM gap through monitoring the gap state over a relatively long time period. The control system further includes control means for the EDM parameter responsive to said first signal for changing the magnitude of the EDM parameter in such a direction that the undesirable condition may be cleared or prevented and responsive to said second signal for changing the magnitude of the EDM parameter in the direction opposite to the first-mentioned direction to promote the machining performance.

Typical EDM parameters for control by the present system include the length of the intermittent retraction of the tool electrode relative to the workpiece which, as noted previously, is used desirably in many EDM operations to remove machining chips and other machining products from the machining gap region, the time duration between successive cycles of the intermittent relative electrode retraction, and the time interval between successive machining pulses, singly or in combination of any two or three. Where two parameters of the intermittent relative electrode retraction are to be controlled, it has been found to be advantageous and effective to control them simultaneously in such a manner to increase the duration of the retraction while decreasing the time interval or machining time in response to the first signal indicated above and to decrease the duration of the retraction while increasing the machining time in response to the signal which is representative of normality of the EDM gap state.

In accordance with specific features of the present invention, the monitor means comprises detector means connected with the EDM gap including counter means for selectively counting those pulses applied across the EDM gap which had each an unfavorable result such as short-circuiting or arc discharge. The counter means, upon counting up a preset number of the unfavorable pulses, is designed to provide the aforementioned first signal. More specifically, the detector means may include a first counter that selectively counts those pulses applied across the EDM gap which had each a favorable result or desired discharge characteristic or machining quality, and a second counter that selectively counts the unfavorable pulses. The second counter is here designed to provide the aforementioned first signal or an output which derives it when this counter has counted a preset number of the unfavorable pulses before the first counter counts a preset number of the favorable pulses.

The detector means may further include a third counter for timing a duration corresponding to the aforementioned relatively long time period, the third counter being coupled with the first and second counters for providing an output which derives the aforementioned second signal in the absence of the output of the second counter which derives the first signal in said time duration. The third counter may count the favorable gap pulses counted by the first counter and provide the output when it has counted up a preset number which is greater than the count number preset for the first counter to provide its output. The third counter may, alternatively, count pulses related to the intermittent relative retraction of the tool electrode to the workpiece to provide the output which derives the second signal upon counting up a preset number of the incoming pulses in the absence of the output of the second counter which derives the first signal. In this connection, it is desirable to control the frequency of the relative retraction as a function of an EDM gap variable such as the gap voltage so that pulses counted by the third counter and hence its count-up signal is related to the machining performance at the EDM gap.

In accordance with further specific aspects of the invention, the control means includes setting means having setting positions corresponding to different preset magnitudes of the EDM parameter and each position selectively actuatable to establish the corresponding magnitude in the EDM apparatus. A pair of signal means provided in the monitor means generate respectively the first and second signals detected in a manner as mentioned and these signals upon each occurence are transmitted to the setting means to establish a magnitude of the EDM parameter increased or decreased from the prior, lower or higher magnitude. The control means may further include a memory means, which can be constituted by an up-down counter, designed to receive and store or memorize said first and second signals. The memory has a possible number of memory levels and output stages which corresponds to the number of the parameter setting positions and is adapted to establish a memory level and provide an output to the setting means, the memory level and output being determined by the storage of the received signals and the newest incoming signal, said output actuating the setting position preset correspondingly to establish the corresponding magnitude of the EDM parameter in the EDM apparatus.

The control means may further include a reference memory means which can again be constituted by an up-down counter and designed to monitor the memory level of the first memory means and regulate the control output thereof. The reference memory means is here designed to count a tine which is still longer than the time counted by the aforementioned third counter. More specifically, the reference counter is designed to lower its memory or count level by one increment when any gap abnormality has not been detected through monitoring the gap state over the long time period after the coincidence of the memory or control level of the first memory means with the reference memory level, permitting the memory or control level of the first memory means to lower its level and output control to the setting means. When a gap abnormality is detected during a preset time after the coincidence, the reference memory raises its reference memory level by one increment while permitting the control level also to raise by one increment. At no time is the control level by the first memory means which provide a control command to the parameter setting means reduced below the reference memory variably established at the reference memory means. The regulation of the control memory or command means by the reference memory means provides a very stable control of the EDM parameter and effectively avoids excessive change in the magnitude thereof to result in an excellent machining performance.

SPECIFIC DESCRIPTION

Figure 1:
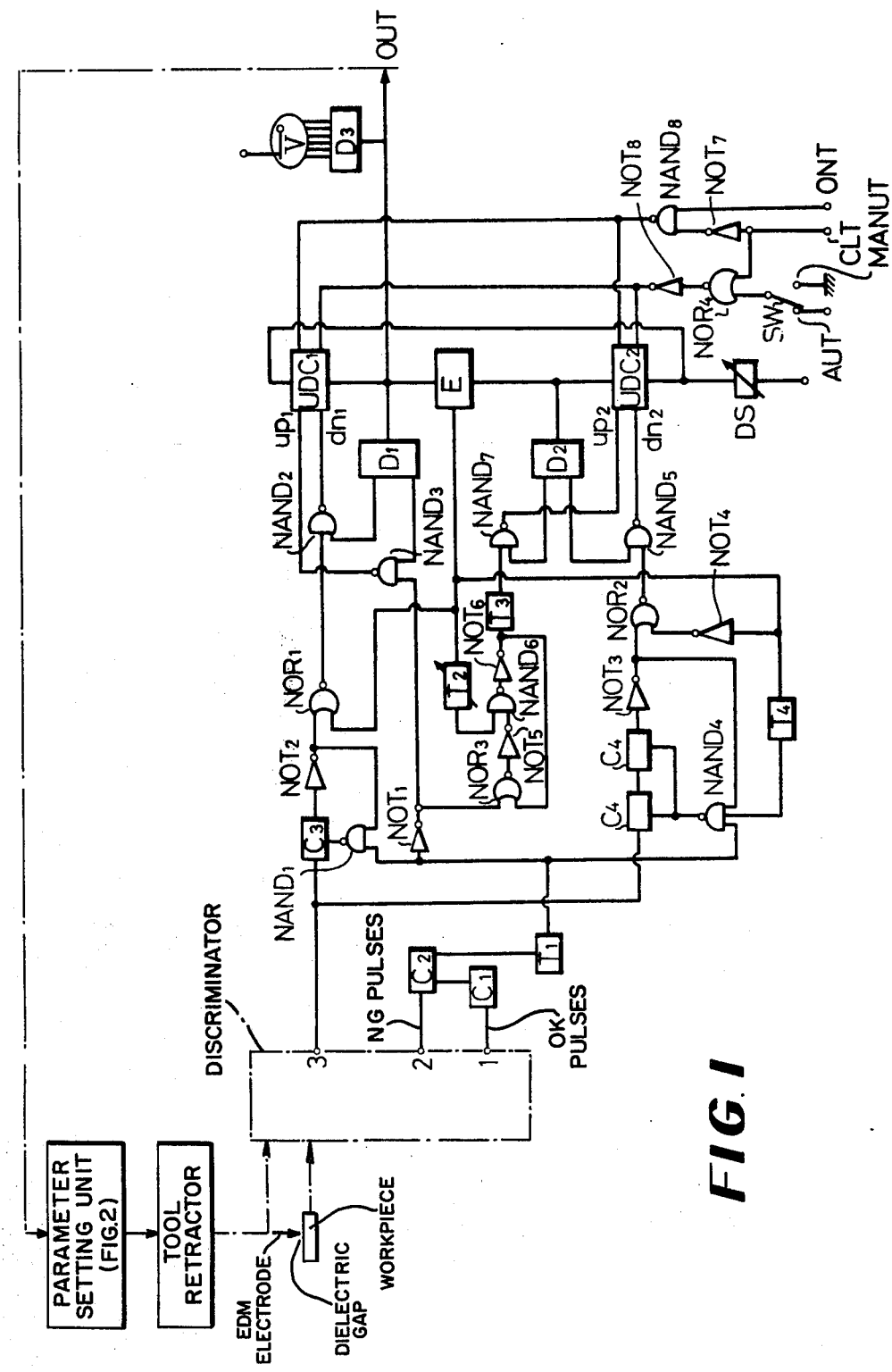
FIGS. 1 and 2 show block diagrams of a control circuit system embodying the present invention.

Referring to FIG. 1, a counter C1 is shown having its input connected to a terminal 1 that receives "OK pulse" signals from a discriminator circuit (not shown) which selectively gates or detects "OK pulses" from among a series of pulses applied to the gap between the tool electrode and the workpiece. The "OK pulse" is the pulse which resulted in a satisfactory machining discharge. Whether each individual pulse applied across the machining gap is an "OK pulse" or not can be determined, for example, by measuring the voltage or current level of the pulse after its initiation of current flow through the gap with respect to a threshold value which will discriminate a normal discharge from a short-circuiting, arcing and other undesirable quality pulse. The counter C1 with its associated input circuitry is thus designed to receive and count OK pulses selectively. When it counts up a given number of the input pulses, say, eight (8) OK pulses, it is cleared and initiates counting again. When the counter C1 is cleared, it outputs a clear signal to a second counter C2.

The second counter C2 has its input connected with a terminal 2 that receives "NG (No Good) pulse" signals from a discriminator circuit (not shown) which selectively gates or detects "NG pulses" among a series of pulses applied across the gap between the tool electrode and the workpiece. The "NG pulse" is a pulse which had an unfavorable result, usually with respect to the current as distinguished from the "OK pulse". The counter C2 with its input circuitry is thus designed to count NG pulses selectively. And, when it counts up a given number of the input pulses, say, four (4) pulses before receiving the clear signal from the counter C1, it provides at its output a trigger signal which regards the condition of the machining gap as "abnormal", the signal triggering a monostable multivibrator or like timer T1 which in turn provides a "0" signal pulse at its output.

The counter C2 is thereupon cleared and rendered ready to commence counting again. If, however, the counter C2 before counting up the preset nunber of NG pulses, is cleared by the clear signal received from the counter C1 indicating that the preset number of OK pulses have occurred, no output will be applied to the timer T1 and the latter will be held in the "1" output mode. Thus, the timer T1 will have a momentary "0" output signal indicative of a gap abnormality selectively when the counter C2 counts up the preset number of NG pulses before the pre-set number of OK pulses are detected by the counter C1. These numbers of pulses to be preset are determined depending upon the type of machining operation being performed, the materials of the tool electrode used and the workpiece to be machined and other machining factors.

A third input terminal 3, coupled to a third counter C3 and a fourth counter C4, is in this embodiment designed to count a reciprocatory movement, i.e. the number of pulses each generated in cadence with the retraction of the tool electrode relative to the workpiece and, when a pre-set number of such movements, say eight pulses, is counted by the counter C3, the latter provides an ouput signal.

This output signal is fed back to the clear circuit of the counter C3 through NOT2 and NAND1 gates, the latter gate having another input terminal connected to the output terminal of the timer T1. Accordingly, it is seen that the counter C3 immediately clears and restarts counting the relative reciprocating movements, whenever a gap abnormality "0" is generated by the timer T1 and received by the NAND1 gate, as well as when it counts up the preset number of reciprocations, the eight counts. The counter C3, upon having counted this preset number, thus generates a "1" output signal, which regards the condition of the gap as normal, when the preset number of NG pulses (four NG pulses) have not occurred and have not been counted by the counter C2 during the time set in the counter C1, this latter time duration being much shorter than the time period in which the preset number of reciprocations is counted by the counter C3.

The output signal from the counter C3 is fed, via NOR1 and NAND2 gates, to the down terminal dn1 of an up-down counter UDC1 to have it count down one increment. This assumes that neither of the NOR1 and NAND2 gates has at each respective other input an inhibiting signal, respectively deriving from a comparator E and a decoder D1 which will be described.

The up-down counter UDC1 is here designed to have 0 to 9 count outputs corresponding to 10 incrementally varied magnitudes of an electrical discharge machining parameter such as the time interval between adjacent machining pulses, the distance or length of the relative retraction of the tool electrode from the machining position in the reciprocatory movement or the time interval between adjacent retracting cycles, i.e. the time interval in which the electrode and the workpiece are held in machining position or any other critical machining parameter. These magnitudes of a parameter are established by the corresponding ten positions provided in a setting device as will be described and adjustably switched over by the corresponding count outputs from the up-down counter UDC1.

The up-down counter UDC1 has a count-up terminal up1 to which the output signal of the timer T1 indicative of a gap abnormality as detected is fed via NOT1 and NAND3 gates to count up by one increment every time the timer generates the "0" signal, provided that there is not an inhibiting input to the NAND3 gate from the decoder D1.

The decoder D1 decoding the up-down counter UDC1 provides inputs to NAND2 and NAND3 gates to inhibit the countdown command from the NOR1 gate and the count-up comand from the NOT1 gate from passing therethrough when the counter UDC1 is at 0 and 9 count levels, respectively.

The fourth counter C4 is designed to provide an output signal when it has counted a preset number of the relative electrode retractions or reciprocations which number is here much greater than the number set for the counter C3, say 128 counts of the relative retraction. The output signal of the counter C4 is fed back to its clear circuit via NOT3 and NAND4 gates connected in series. The latter has a second input terminal led from the timer T1 aforementioned and a third input terminal led from a timer T4 which in turn is connected to the comparator E which has a normally "0" output but, when the output is turned to "1", actuates the timer T4 which then provides a momentary "0" output signal. Accordingly, the counter C4 immediately clear and restarts its counting when it has counted the preset number, the 128 counts, when a gap abnormality "0" signal is received by the NAND4 gate from the timer T1 or when the NAND4 receives the "0" output of the timer T4 which indicates the output of the comparator E turning to "1". In terms of the operation, the counter C4 starts counting upon the clarification of its previous counts by the "0" output of the timer T4 applied to the NAND4 gate. When it has counted the 128 input pulses without a gap abnormality "0" signal from the timer T1, the counter 4 will provide the "0" signal at the output of the NOT3 gate and to one input terminal of NOR2 gate. The other terminal of the latter is fed by an inverter NOT4 whose input terminal is connected to the comparator E. Thus it is seen that the "0" signal indicating the completion of the 128 counts is admitted through the NOR2 gate and provides "1" signal at the output thereof only when the output of the comparator E, whose function will be described, is "1". The admitted signal is in turn fed via a NAND5 gate to the down command input dn2 of an up-down counter UDC2 to reduce its count level by one count. Decoder D2 monitors the count level of the counter UDC2 and provides a signal to the NAND5 gate which inhibits the down command from being applied to the counter UDC2 when the latter has had the lowest or 0 count level.

The comparator E is connected between the first and second up-down counters UDC1 and UDC2 and, as mentioned previously, has normally a "0" output. It is designed to provide "1" output when the count level of the first up-down counter UDC1 coincides with that of the second up-down counter UDC2. When the "1" signal is developed, the NOR1 gate is disabled or closed thereby so that if the count-down command is generated by the counter C3, this may not count down the counter UDC1 and the latter may hold the existing count level. Thus at no time will the first-up down counter UDC1 reduce its count level below that of the second up-down counter UDC2. As has been noted, the "1" output of the comparator E is also fed on the one hand to the timer T4 to reset the counter C4 and on the other to the NOR2 gate via the inverter NOT4. It follows that the counter C4 is allowed to start or restart counting pulses corresponding to the intermittent relative electrode retractions and the gate NOR2 is enabled or opened as soon as the count level of the first up-down counter UDC1 coincides with that of the second up-down counter UDC2, and that the count-down command is available to the input of the second up-down counter UDC2 upon the counter C4 completing the preset count number (128 counts) and if the coincidence of the count level is maintained between the two updown counters UDC1 and UDC2. If in the meantime a gap abnormality is detected by the counters C1 and C2 and the "0" signal is developed at the output of the timer T1 accordingly, the counting operation by the two-stage counter C4 is terminated and reset. Thus the count-down action of the second up-down counter is strictly regulated.

The count-up terminal up2 of the up-down counter UDC2 is connected to the output of the NOT1 gate via NOR3, NOT5, NAND6, NOT6, T3 and NAND7 in series, the NOT1 gate providing the inverted gap normality "0" output and gap abnormality 37 1" output corresponding to the gap normality "1" output and gap abnormality "0" output of the timer T1. In this series circuit, the NAND6 has one input terminal connected to the output of a timer T2 whose input is connected to the comparator E. As long as the latter has a "0" output, the timer T2 remains deactuated providing a "0" output to the NAND6 and thus holding this latter gate closed to its input signals and as a result the input to the timer T3 is held at "0" which input is fed back to the NOR3 gate. When, however, the output of the comparator E is turned to "1" in response to the count level of the first up-down counter UDC1 dropping to coincide that of the second up-down counter UDC2, the timer T2 is actuated to open the NAND6 gate and to hold it opened for a preselected time interval, say 40 seconds, which depends on the purpose of the machining operation and materials of the electrode and the workpiece and other machining factors.

In this time interval, when a gap abnormality signal is detected by the NOT1 gate and thus NOR3 gate receives a "1" output therefrom, this signal is transmitted through NOT5, NAND6 and NOT6 gates and develops a "1" input to the timer T3 to actuate it. The pulse generated by the timer T3 is fed via the NAND7 gate to the count-up terminal up2 of the up-down counter UDC2 to raise its count level by one. Meanwhile, the same gap abnormality "1" output of the NOT1 gate is also fed via the NAND3 gate to the count-up terminal up1 of the first up-down counter UDC1 to raise its count level by one. The first up-down counter UDC1 may further raise its count levels incrementally if and every time it receives a further gap abnormality "1" signal from the NOT1. As will be readily apparent, however, the second up-down counter UDC2 is here forbidden to raise its count level by more than one for said preset time interval, 40 seconds. After the beginning of the timer interval, once a single gap abnormality signal is received, the "1" signal developed at the output of the NOT6 gate is fed back to the NOR2 gate which is locked thereby and the resetting of the NAND6 gate is inhibited until the timer T2 times out the interval and its output is returned to "0". After the interval is timed out, the timer T2 will remain deactuated until it receives a further "1" signal of the comparator E which indicates that the count level of the up-down counter UDC1 again coincides with that of the up-down counter UDC2. And, of course, if no gap abnormality signal is received from the timer T1 during the time interval established by the timer T2, no count-up takes place in the up-down counter UDC2.

The significance of the functions of the second up-down counter UDC2 which is used herein as reference or regulator counter for the first, machining-parameter control counter UDC1 will be more fully understood from the description which follows.

Let is be assumed that the counter UDC2 has now had the n-th count level of the possible 0 to 9 incremental count while the control counter UDC1 in response to the incoming signals is performing or repeating count-up and count-down in the range of count levels higher than the n-th level and is switch-controlling control positions in the setting device in accordance therewith, thus magnitudes of a machining parameter set by these positions. Following such a condition, the control counter UDC1 may lower its count level to coincide with the n-th level of the reference counter UDC2, in response to the gap signal received by its down terminal indicating that the machining performance at the machining gap is going better. A new magnitude of the machining parameter is then established in the setting device to correspond to the n-th count level by the counter UDC1 and used for subsequent machining. If the new parameter magnitude is in fact adequate to permit machining to proceed satisfactorily, there should, during the appropriate time interval established by the timer T2, develop no gap abnormality signal requiring the count-up to be made to return the magnitude of the machining parameter to the previous one, and the system properly maintains the n-th count level and hence the n-th parameter magnitude until the appropriate time interval terminates.

It is important to note that after the control counter UDC1 count level has coincided with the reference counter UDC2 count level, the "gap normality" signal will again and repeatedy appear at the output of the counter C3 and at the input of the NOR1 gate which leads via the NAND2 gate to the count-down input terminal of the control counter UDC1. In the system provided, however, transmission of this signal is inhibited by the "1" output of the comparator E so that the control counter UDC1 is locked against any further down-count command for a relatively long time interval, namely until after a preset number of pulses, e.g. 128 pulses have been counted by the counter C4. Thus, only after the completion of the later counts which results in the one count-down of the reference counter UDC2 count level is the control counter UDC1 permitted to reduce its control count level by one in response to a gap normality signal, at which time the count levels of the two up-down counters coincide again. This effectively minimizes the premature count-down of the control counter UDC1 and this eliminates the excessive degree of change of the magnitude of the machining parameter which would have damaging results to the workpiece and avoids an excessive reversed change of the parameter value or a "hunting" condition.

After the coincidence of the count level between the control counter UDC1 and the reference counter UDC2, it is possible that the newly established magnitude of the machining parameter is, when used, inadequate to permit machining to go on satisfactorily but such a premature count-down is detected and corrected promptly. Upon the coincidence at the n-th count level between the two counters, the timer T2 immediately initiates the monitoring period, e.g. 40 seconds, during which period a gap abnormality signal, if developed, is transmitted by the timer T1 to the count-up terminal of the control counter UDC1 to return its count level to the previous one, the $(n+1)$th level. At the same time, the gap abnormality signal raises also the reference counter UDC2 count level by one. Thus, the new reference level, $(n+1)$th level is established which prohibits the control counter UDC1 count level to drop therebelow. During the monitoring period above, a further gap abnormality signal may be detected and developed by the timer T1 which will then raise the control counter UDC1 to the $(n+2)$th count level which in turn readjusts the magnitude of the machining parameter accordingly so as to prevent the gap abnormality from recurring. The count level of the reference counter UDC2, however, remains at the $(n+1)$th level and awaits a drop of the control counter UDC1 counter level to this reference level.

With the coincidence of the two counters UDC1 and UDC2 at the n-th count level, a situation will also arise which requires a temporary count-up of the control counter UDC1 counter level. Thus, if no gap abnormality signal is detected during the test period which commences upon the the coincidence of the two counters' count levels and terminates upon the lapse of the time established by the timer T2 (40 seconds), the two counters UDC1 and UDC2 will, after the termination of said test period, maintain the coinciding n-th count levels, the control counter UDC1 providing the magnitude of the machining parameter defined thereby. Thereafter, if an abnormal condition occurs at the machining gap, the timer T1 will provide a gap abnormality signal indicative thereof to cause the count level of the control counter UDC1 to increase by one count to the $(n+1)$th level while the count level of the reference counter UDC2 is maintaind at the n-th level. The $(n+1)$th count level of the control counter UDC1 provides the new magnitude of the machining parameter and, if the abnormal gap condition is removed promptly, the counter C3 will count up the preset number of pulses, e.g. eight counts as noted previously, to return the control counter UDC1 to the n-th level. If the abnormal gap condition is not cleared or another gap abnormality is created, a further signal indicative thereof will be developed by the timer T1 to raise the control counter UDC1 to the $(n+2)$th count level. Then, if the machining gap resumes acceptable discharge performance or a favorable machining condition, the elevated count level is prompty reduced incrementally in response to the gap normality signals developed by the counter C3 until it is returned to the n-th level.

At the right hand side of FIG. 1 there is shown a readout unit having a display decoder D3 and a tube display V connected with the output terminal of the control counter updown counter UDC1 to provide a visual display of the output signal thereof, the control count level, which signal is also fed via the output terminal OUT to the parameter setting unit which will be described with reference to FIG. 2.

In FIG. 1 there is also shown a digital switch, indicated by the reference character DS, designed to permit the manual setting of the count level of each of the two counters UDC1 and UDC2. The digital switch DS is associated with a selector switch SW used to selectively connect an "automatic" terminal AUT and a "manual" terminal MANUT with the two up-down counter UDC1 and UDC2 via a NOR4 and a NOT8 gate. This arrangement insures that a manipulation of the digital switch DS is effective for the counters UDC1 and UDC2 only when the manual terminal MANUT is set at the switch position, thus it is ineffective when the AUT terminal is in the switch position which locks the counters against the functioning of the digital switch DS. Use of the digital switch is required or desirable in certain types of machining operation which are advantageously to be started at an initial reference count level which is greater than the "0" level. In these operation, different initial reference levels are desirable or required to be used depending on the configuration of the tool electrode and the shape to be imparted to the workpiece as well as for switching a "rough" operation to a "finish" operation in machining a single workpiece.

Reference character CLT designates an input terminal for providing a clear signal to counters UDC1 and UDC2 to return the count levels of these counters to 0 when desired, e.g. at the end of a given machining operation. The clear signal from the terminal CLT is fed to the counters via the NOT7 and NAND8, the latter having another input terminal ONT connected thereto. The input terminal ONT is here designed to provide a clear signal when the EDM power supply is switched on so that the previous count storage if any may be removed automatically at the start of a new machining operation.

Figure 2:
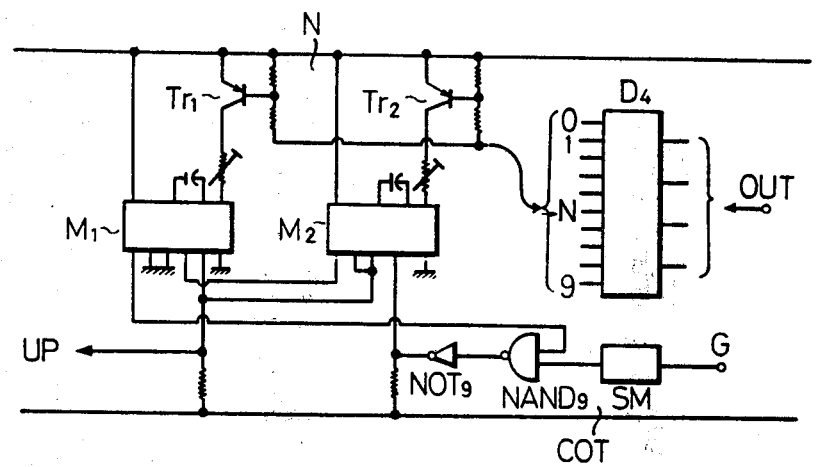

Referring now to FIG. 2 which illustrates an embodiment of the machining-parameter setting device for use herein, the output of the control up-down counter UDC1 which develops at its output terminal OUT is shown applied to a decoder D4 which is designed to provide the control command for controlling the magnitude of one or more of controllable EDM parameters in accordance therewith. More specifically, the decoder D4 here is provided with 10 output stages to correspond to the 10 count levels of the control counter UDC1 and is selectively actuatable by the occurrence of the corresponding count level to select and establish one of the 10 different magnitudes for each of one or more of the EDM parameters. In the FIGURE, only the n-th setting stage or circuit is shown coupled to the n-th output of the decoder D4 for the sake of clarity and it will be understood that 9 similar setting circuits are coupled respectively to the other 9 outputs of the decoder D4. As noted previously, the critical EDM parameters include as typical the time interval between adjacent discharge machining pulses, the length of the retraction of the tool electrode away from the workpiece in the reciprocatory movement which is used and effected independently of the gap-adjusting servomechanism (relative displacement of tool and workpiece), the time interval between adjacent cycles or strokes of the reciprocatory movement, i.e. the time duration in which the electrode and the workpiece are held in machining position to permit discharges to take place, the reference voltage or control level in the servo feed control and the rate of the forced circulation of the dielectric liquid through the machining gap. In the description which follows, an explanation of the control system proposed hereby will be made of the two variables mentioned above of the reciprocatory movement.

Each setting circuit includes a pair of transistor switches Tr1 and Tr2 which are coupled with monostable multivibrators M1 and M2, respectively. As mentioned before, each setting circuit receives an input signal from the decoder D4 selectively addressed thereto. Thus, the n-th setting circuit receives such a signal from the n-th output of the decoder D4 when the control up-down counter has the n-th level, at which time no output signal develops at the other 9 outputs of the decoder D4. The transistor switches Tr1 and Tr2 are rendered and held conductive when, and while, they receive the input signal to make and hold the monostable multivibrators M1 and M2 operable. Here the first monostable multivibrator M1, if triggered, provides at the terminal UP a pulse of a duration set to correspond to a given length of the electrode retraction relative from the workpiece in the reciprocatory movement. The second monostable multivibrator M2, if triggered, provides at the same terminal UP a pulse whose duration is set to define a given length of time, the machining time interval, between adjacent reciprocatory cycles, more specifically between the time when the electrode is returned to the machining position and the time when the electrode is thereafter retracted to interrupt the machining. A circuit for triggering the second monostable multivibrator M2 is designated be reference character COT and comprises a terminal G connected to the machining gap to sense the mean gap voltage, and Schmitt trigger circuit SM which discriminates the mean gap voltage with respect to a threshold value and, when the gap voltage drops below this value, provides a trigger signal to the multivibrator M2 through NAND9 and NOT9. The first multivibrator M1 initiates its timing operation upon the timing out of the second monostable multivibrator M2. The NAND9 gate has the second input led from the first multivibrator M1 to hold the second multivibrator M2 against actuating while the first multivibrator is in operation. The signals developed at the terminal UP are applied to a control circuit in the electrode drive system, e.g. control coils in the hydraulic servo feed system to supplant any servo signal then developing.

Figure 3:
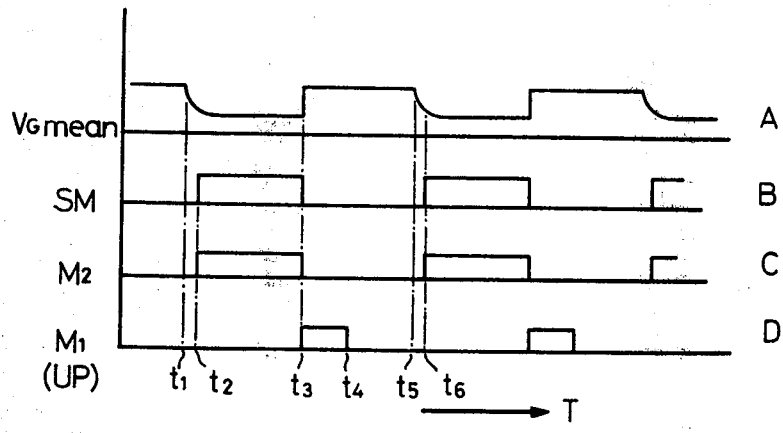
FIG. 3 shows waveforms appearing at portions of the circuit of FIG. 2.

In FIG. 3 there are shown waveforms encountered in the system of FIG. 2 and in which the amplitude is plotted along the ordinate against time plotted as the abscissa; the waveform A represents the gap mean voltage appearing at the terminal G, waveform B represents the output of the Schmitt trigger SM, waveform C represents the output of the monostable multivibrator M2 and waveform D represents the output of the monostable multivibrator M1.

Assume that the transisotrs Tr1 and Tr2 are switched on in response to the output of the decoder D4 to render the multivibrators M1 and M2 ready for operation. Assume also that then the tool electrode has been retracted away from the workpiece. Thereupon, the tool electrode approaches the workpiece to narrow the gap between them. At t1 the first of a series of machining electrical discharges is shown to take place. The occurrence of the electrical discharges will initially be sporadic but with the further decrease of the gap spacing their occurrence per unit time approaches that of the electrical pulses applied to the machining gap with the resulting gradual decrease of the gap mean voltage as shown. At $t2$ it is shown that the gap spacing reaches an optimum value at which machining is to proceed and the Schmitt trigger circuit SM in response to the reduction of the mean gap voltage below a preset level is operated to provide a digital "1" output which triggers the monostable multivibrator M2 into actuation. The preset time constant in the multivibrator M2 determines the machining time or the time duration in which the tool electrode and the workpiece are held in machining juxtaposition. At $t3$ upon termination of this time duration the deactuation of the multivibrator M2 triggers the multivibrator M1 into actuation, providing at the terminal UP a signal pulse to retract the tool electrode away from the workpiece. At $t4$, the electrode retracting signal pulse is shown to terminate, at the time that the electrode reaches the uppermost position or shortly thereafter. The servo signal will then allow the electrode to automatically reapproach the workpiece, permitting the aforesaid cycle to be repeated from the time $t5$ and the fixed machining time duration to reinitiate at $t6$. The time interval betwen $t4$ and $t5$ or $t6$ which represents the time required automatically return the electrode to the machining position by the servo signal is, as will be apparent, generally proportional to the length or the extent of the electrode retraction determined by the time interval between time $t3$ and $t4$. A suitable means, however, may be employed to reduce or independently adjust the time interval $t4$–$t5$ or $t4$–$t6$ so that the machining interruption period or rest time $t3$–$t5$ or $t3$–$t6$ can be reduced or controlled as desired.

It should be understood that the use of term of "machining interruption period" or "machining rest time" for the time interval between $t3$ and $t5$ herein, is not intended to exclude the possibility of some electric discharges or machining function occurring during this time interval. In fact, when a length of retraction as short as 0.01 to 0.02 mm is used, a portion of applied electrical pulses may actually bring about electrical discharges across the widened gap during the time interval in question although the frequency of the discharges then is reduced sharply.

As noted previously, each of ten setting circuits or stages respectively coupled with ten outputs of decoder D4 has the same construction and mode of operation as shown and has been described, with the exception of time settings of multivibrators M1 and M2 which each vary one setting stages from another progressively or incrementally to provide different magnitudes of the length of the electrode retraction and of the machining duration. Thus, in a typical example, the multivibrator M1 in the n-th setting stage is designed to provide the magnitude of the length of the electrode retraction which is greater by a preset amount than the magnitude provided by the (n-1)th stage multivibrator M1 and smaller by the same or a different preset amount than the magnitude provided by the (n+1)th stage multivibrator M1. Similarly, the multivibrator M2 in the n-th setting stage is designed to provide the magnitude of the machining duration (i.e. the time duration in which the electrode and the workpiece are held closely spaced in a desired machining position) which is shorter by a preset amount than the magnitude provided by the (n-1)th stage multivibrator M2 and longer by the same or a different preset amount than the (n+1)th stage multivibrator M2.

Although one of the two time setting means M1 and M2 is each setting stage can be employed to effect the control of either the length of the electrode retraction or the machining duration stepwise in response to the novel detector and command system provided herein, it has been found to be particularly advantageous to employ both and control these two parameters simultaneously and in combination with each control in the manner as described, namely such as to increase the length of the electrode retraction and to decrease the machining duration as the ordinal number of the setting stages elevates. This does, it has been found, effectively prevent arcing damage to the workpiece and the electrode and maintain the machining performance at an optimum level. An example of these parameter settings is shown in the following table:

TABLE I

| Setting Taps | Retraction Pulse Duration (t3—ms) | Retraction Length (Rated: mm) | Machining Duration (t2–53: ms) |
|---|---|---|---|
| 0 | 14 | 0.00 | 450 |
| 1 | 40 | 0.10 | 450 |
| 2 | 65 | 0.20 | 355 |
| 3 | 90 | 0.26 | 310 |
| 4 | 115 | 0.33 | 260 |
| 5 | 145 | 0.40 | 215 |
| 6 | 170 | 0.46 | 170 |
| 7 | 195 | 0.52 | 120 |
| 8 | 220 | 0.58 | 73 |
| 9 | 250 | 0.65 | 25 |

The time interval between adjacent discrete electrical discharge pulses can be controlled similarly in accordance with the present invention. In this case, the pulse generator which provides signal pulses for creating these discharge pulses may be designed to have different time settings which are respectively actuatable by outputs of the decoder D4 so as to provide different preset magnitudes of the time interval respectively in accordance with different count levels that are registered by the control counter UDC1. Here, the different time setting means may each include a capacitor or resistor, constituting a time determining element therein, which is selectively switched and operable in the circuit responsive to the corresponding output of the decoder D4 when the counter UDC1 has the count level preset to correspond thereto.

It should be noted that the input to the terminal 3 in FIG. 1 need not be limited to pulses related to the electrode reciprocatory movement mentioned earlier. As an alternative thereto, "OK signal pulses" as output at the counter C1 which are indicative of the gap normality can be input to the terminal 3. The use of the "OK signal pulses" as the input to the counters C3 and C4 is particularly advantageous where the machining parameter to be controlled is the time interval between adjacent discrete discharge pulses.

EXAMPLE

Figure 4:
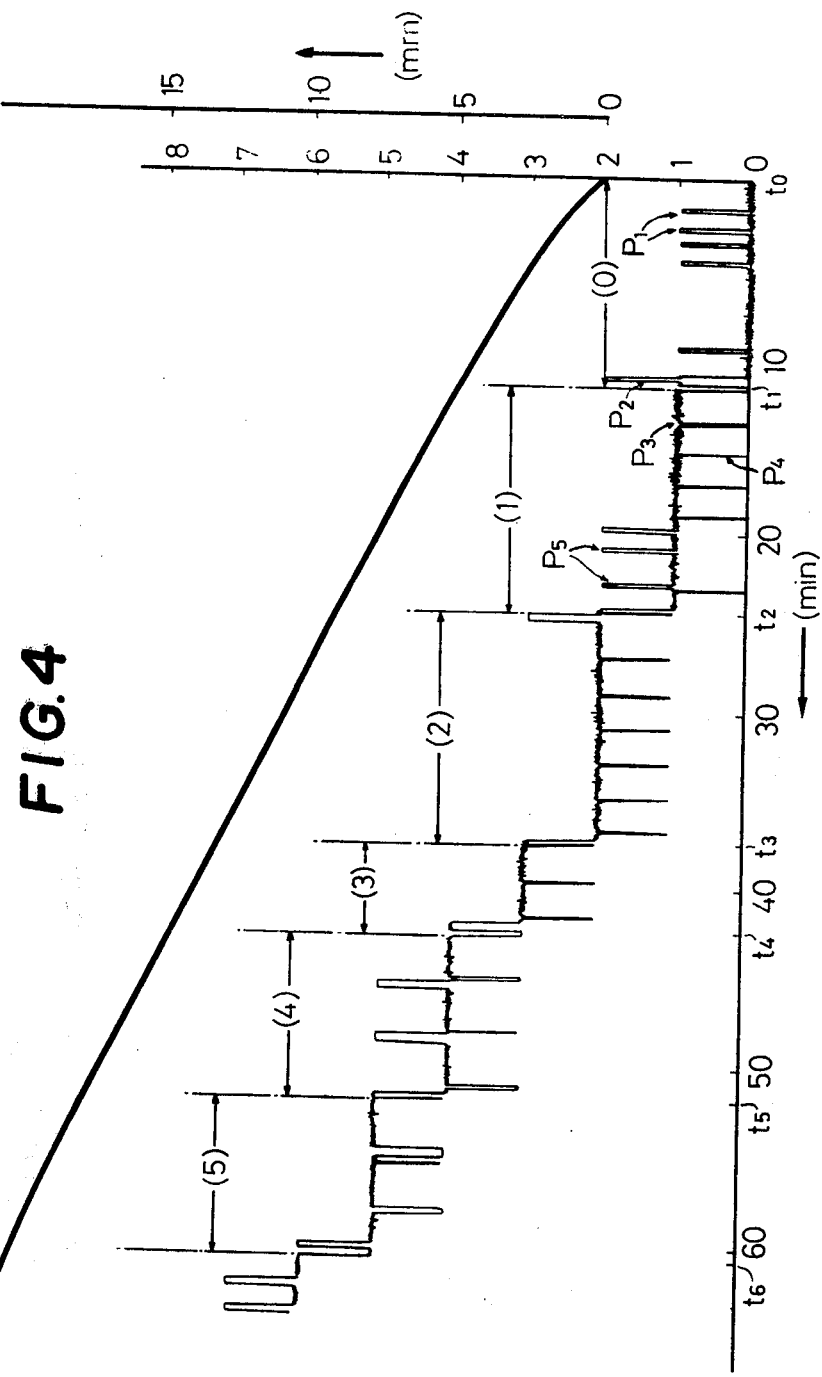
FIG. 4 is a graphic representation of the progress of an EDM machining operation using an embodiment of the present invention.

With kerosene as the machining dielectric liquid and used not "circulated", a workpiece of S55C was immersed therein and was EDM machined using a cylindrical copper electrode of a diameter of 20 mm. EDM pulses applied between the electrode and the workpiece had a pulse duration of 650 microseconds, a pulse interval or rest time of 90 microseconds and a current amplitude (short-circuit current) of 70 amperes. A gap detector and control system generally shown in and described in connection with FIGS. 1 to 3 was used to control, in the course of the machining operation, the intermittent retractive or reciprocatory movement of the electrode relative to the workpiece with the ten setting levels of the length of the retraction and the machining duration between adjacent reciprocatory cycles shown in the table I set forth earlier. FIG. 4 shows the performance of the EDM operation in a graphic form in which time is plotted along the abscissa and the progress of machining represented by the depth of the cavity (mm) being formed in the workpiece (solid curve) and the change of the count levels (count No. 0 to 9) of the control up-down counter UDC1 (fluctuating curve) are plotted along the ordinate. Bracketed reference numerals in the graph (1), (2), (3), (4), (5) .... denote average or typical count levels of the counter UDC1 which, as shown, are controlled to raise stepwise with the progress of machining.

As is apparent from the graph, the machining operation was started with the control counter UDC1 and the reference counter UDC2 both initially set at the 0 level and during the interval t0 to t1 the reference counter UDC2 remained at the count level 0. During this period, it is seen that a single count-up took place in the counter UDC1 four times, as designated by reference P1, each due to the detection by the timer T1 and its associated circuitry of an abnormal condition in the machining gap and each count-up switching the setting unit from the tap 0 to the tap 1 in the table I. Upon this change, at each occurrence, it is seen that the count level was returned to 0 promptly. This shows that following the count-up no further abnormality signal was detected by the time the counter C3 counted eight consecutive retractions of the electrode. Shortly before t1, it is seen that the counter UDC1 raised its count level from 0 to 1 and from 0 to 2, by two steps. The raised level, denoted by reference P2, is shown to have then immediately dropped to 0 but the count level was thereupon raised again to 1 at t1. This raise shows that an abnormal gap condition was detected during the time the timer T2 was in operation; thus the reference count level, the count level of the reference counter UDC2 was also raised to 1.

In the second step (1), it is shown that the count level was dropped to 0 at P3. This represents the fact that the counter C4 counted 128 consecutive electrode retractions and no gap abnormality signal was detected in the meantime, causing the reference level to drop to 0. The count level of the control counter UDC1 was also dropped to 0 due to the fact that the counter C3 had counted 8 consecutive electrode retractions. The count-down to 0 is shown followed immediately by a count-up to 1 in the count level of counters UDC1 and UDC2 both, which was caused by occurrence and detection of an abnormal gap condition. Similar countdown and count-up occurred at P4 and two times thereafter. Such repeated temporary count-down, however, has advantages and is highly significant here. It does hold the machining efficiency at a best possible level by removing an unnecessary count-up which would otherwise ensue under certain gap conditions and which is clearly a cause of drop in machining efficiency. In spite of these efforts, it will be seen that at P5 a count-up was required in the counter UDC1 and subsequently the count level of the reference counter UDC2 elevated to 2. This means that a stable maching could no longer be maintained with the count level 1.

It will be appreciated that the reference counter provides an effective and advantageous means which insures a stable and nearly sequential shifting as required, with the progress of an EDM operation, of the count level of the control counter, hence the control level of the parameter setting means without the level being caused to fluctuate up and down excessively, and which thus results in an increased machining efficiency and a machining operation free from the danger of thermal arc discharges which damage the workpiece and the electrode.

While the illustration of the principles of the present invention has been made in the foregoing principally with reference of the control of the intermittent retractive or reciprocatory movement of the tool electrode relative to the workpiece employed to effect the removal of maching chips and other products from the gap region, the principles of the invention are equally applicable to any one or more of the other critical machining parameters such as the time interval between adjacent maching pulses. The adaption of the invention and modification of the illustrated embodiment to such other parameters will be clear to those skilled in the art.

From the foregoing, it will be appreciated that the present invention provides an improved control system which controls a machining paraameter in such a manner to promptly clear an undesirable machining condition if created and to prevent such condition from occurring with the mode of control continuously in adaptation to the changing state of of the machining gap and through monitoring the gap state in a unique and effective manner. By virtue of the novel features, the invention not only assures a improved machining efficiency but has made possible the accomplishment of a given and required machining operation on a full and completely automatic basis without the need of supervision by the operator while preventing the machining mode from shifting to a damaging thermal arc or other dangerous conditions without failure and with a desired machining result.

I claim:

1. A system for controlling an EDM parameter in the operation of an EDM apparatus, comprising:

input circuit means having an input terminal connected in circuit with an electrical discharge machining gap formed between a tool electrode and a workpiece and adapted to respond to the state of electrical discharge machining performance in the gap for providing a first signal upon detection of the occurrence of a predetermined condition in the gap within a first time period and providing a second signal upon non-detection of such a condition in the gap throughout a second time period, and timing means for establishing said second period with a duration greater than that of said first period;

memory means connected to said input circuit means and adapted to receive said first and second signals and having a memory level arranged to be changed in accordance with the latest-received of these signals; and setting means with an ordered set of positions arranged to establish respective values of said parameter corresponding to memory levels in said memory means and to be altered in respective directions in the ordered set in accordance with change in corresponding directions of the memory levels of said memory means; said circuit means including:

a first preset counter means with a input terminal connected in circuit with said machining gap adapted to count electric pulses effected therethrough with an unsatisfactory machining result selectively for issuing said first signal upon counting up a preset number of such pulses within said first period, the first counter means being arranged for resetting upon termination of said first period;

a second preset counter means with an input terminal connected in circuit with said machining gap and coupled to said first counter means and adapted to count electric pulses effected through the gap of a satisfactory machining result selectively and arranged for resetting upon counting up a preset number of such pulses to define said first period; and a third preset counter means connected with a pulse source and arranged for resetting upon counting up a preset number of pulses to define said second period.

2. The system defined in claim 4 wherein said first preset counter means is coupled to said second preset counter means and adapted to provide an output to supply said second signal upon counting up such a preset number of pulses from said pulse source in the absence of said first signal.

3. The system defined in claim 2 wherein said pulse source in constituted by the electrical discharge machining gap, said third counter means counting pulses related to the machining performance in the gap.

4. The system defined in claim 3 wherein said third counter means has an output coupled to the input to said second counter means and is adapted to provide an output to supply said second signal upon counting up a preset number of said satisfactory pulses which is greater than said preset number of pulses for said first counter means.

5. The system defined in claim 1 wherein said third counter means has an input arranged for counting pulses related to intermittent relative retractions between the tool electrode and the workpiece which retractions constitute said pulse source.

6. A system for controlling an EDM parameter in the operation of an EDM apparatus, comprising:

input circuit means having an input terminal connected in circuit with an electrical discharge machining gap formed between a tool electrode and a workpiece and adapted to respond to the state of electrical discharge machining performance in the gap for providing a first signal upon detection of the occurrence of a predetermined condition in the gap within a first time period and providing a second signal upon nondetection of such a condition in the gap throughout a second time period, and timing means for establising said second period with a duration greater than that of said first period:

memory means connected to said input circuit means and adapted to receive said first and second signal and having a memory level arranged to be changed in accordance with the latest-received of these signals; and setting means with an ordered set of positions arranged to establish respective values of said parameter corresponding to memory levels in said memory means and to be altered in respective directions in the ordered set in accordance with change in corresponding directions of the memory levels of said memory means, said memory means comprising an up-down counter means adapted to define said memory level, said up-down counter means having a first input terminal connected with said input circuit means through a gate means for permitting the gating of said second signal to said up-down counter means, the latter having a second input terminal receiving said first signal to change the memory level thereof by one increment in a predetermined direction.

7. The system defined in claimed 6 wherein a second up-down counter means is connected with said first-mentioned up-down counter means through a comparator means and with said input circuit means, the comparator means providing an output when the memory level of said first up-down counter means coincides with that of said second up-down counter means to permit said second signal to be passed through said gate means and injected into said first up-down counter means to change the memory level thereof by one increment in a predetermined direction opposite to said predetermined direction.

8. The system defined in claim 7 wherein said second up-down counter means has a first input terminal connected with said input circuit means through a second gate means adapted to receive said first signal, said second gate means being associated with a further timing means and the latter being connected with said comparator means and actuatable by said output thereof to time a third time period longer than said second period and to open said second gate means so that said first signal if produced may be injected into said first input terminal of said second up-down counter means for changing the memory level thereof by one increment in a said first-mentioned predetermined direction.

9. The system defined in claim 8 wherein said second up-down counter means has a second input terminal connected with said input circuit means through a third gate means adapted to receive said first signal, said third gate means being connected with said comparator means and arranged to initiate the timing of a fourth time period longer than said third period upon receiving said output of the comparator means and to open said third gate means to provide an output into said second input terminal of said second up-down counter means for changing the memory level thereof by one increment in a said second predetermined direction in the absence of said first signal within said fourth period.

10. The system defined in claim 9 wherein said further timing means is constituted by a fourth preset counter means having an input terminal connected with the input to said third preset counter means and arranged for resetting upon counting up a preset number of incoming pulses, or upon receiving said first signal.

11. An EDM apparatus including a system as defined in claim 7 and means for effecting intermittently relative retraction between the tool electrode and the workpiece, wherein said parameter is the length of the relative retraction.

12. An EDM apparatus including a system as defined in claim 7 and means for effecting intermittently relative retraction between the tool electrode and the workpiece, wherein said parameter is the time interval between adjacent cycles of the intermittent relative retraction.

13. An EDM apparatus including a system as defined in claim 7 and means for effecting intermittently relative retraction between the tool electrode and the workpiece, wherein said parameter is a combination of the parameters defined by the length of the intermittent relative retraction and the time interval between adjacent cycles of the relative retraction.

14. An EDM apparatus including a system as defined in claim 7 wherein said parameter is the time interval between adjacent machining pulses.

15. A system for controlling an EDM parameter in the operation of an EDM apparatus comprising:

monitor means coupled with an EDM gap formed between a tool electrode and a workpiece for monitoring the state of EDM performance therein to provide a first signal upon detection of an undesirable condition in the EDM gap through the monitoring thereof over a relatively short time period and to provide a second signal upon nondetection of such a condition in the EDM gap through the monitoring thereof over a relatively long time period; and control means for the EDM parameter responsive to said first signal for changing the magnitude of the EDM parameter in such a direction that the undesirable condition may be removed and responsive to said second signal for changing the magnitude of the EDM parameter in the direction opposite to the first-mentioned direction, said monitor means comprising detector means connected with the EDM gap including a first counter for selectively counting those pulses applied across the EDM gap each representative of an undesirable condition, said second counter being coupled with the first counter and providing an output which derives said first signal upon counting up a preset number of the incoming undesirable gap pulses before the first counter counted up a preset number of the incoming desirable gap pulses, said detector means further including a third counter for timing a time duration coupled with said first and second counters for providing an output which derives said second signal in the absence of the output of the second counter which derives said first signal in said time duration.

16. The system of claim 15 wherein said third counter is coupled with the EDM gap for counting pulses related to the machining performance in the EDM gap.

17. The system of claim 16 wherein said third counter has an input coupled with the output of the first counter for providing an output which derives the second signal upon counting up a preset number of the favorable gap pulses which is greater thn said preset number of the pulses for the first counter.

18. The system of claim 16 wherein said third counter has an input for counting pulses related to the intermittent relative retraction of the tool electrode to the workpiece and providing an output which derives said second signal upon counting up a preset number of pulses related to the intermittent retraction in the absence of the output of the second counter which derives said first signal.

19. A system for controlling an EDM parameter in the operation of and EDM apparatus comprising:

monitor means coupled with an EDM gap formed between a tool electrode and a workpiece for monitoring the state of EDM performance therein to provide a first signal upon detection of an undesirable condition in the EDM gap through the monitoring thereof over a relatively short time period and to provide a second signal upon non-detection of such a condition in the EDM gap through the monitoring thereof over a relatively long time period; and control means for the EDM parameter responsive to said first signal for changing the magnitude of the EDM parameter in such a direction that the undesirable condition may be removed and responsive to said second signal for changing the magnitude of the EDM parameter in the direction opposite to the first-mentioned direction, said control means including setting means having setting positions provided corresponding to preset different magnitudes of the EDM parameter and each selectively actuatable to establish the corresponding magnitude in the EDM apparatus, said monitor means including a pair of signal means respectively providing said first and second signals, upon each occurrence, to said control means to change setting positions in the setting means to establish a magnitude of the EDM parameter increased or decreased from a prior lower or higher magnitude thereof in accordance with the signal, said control means further including a memory means coupled with said signal means for storing said first and second signals and establishing a memory level and providing an output to said setting means, said memory level and output determined by the storage of the signals and the newest signal received by the memory means, said output actuating the setting position in the setting means preset to correspond thereto establish the corresponding magnitude of the EDM parameter in the EDM apparatus.

20. The system of claim 19 wherein said control means further includes a reference memory for monitoring the memory level of the first memory means and regulating the output thereof.

* * * * *